United States Patent [19]

Hasegawa

[11] Patent Number: 4,557,242

[45] Date of Patent: Dec. 10, 1985

[54] AIR/FUEL RATIO FEEDBACK CONTROL SYSTEM FOR AN INTERNAL COMBUSTION ENGINE OF A VEHICLE

[75] Inventor: Shumpei Hasegawa, Niiza, Japan

[73] Assignee: Honda Giken Kogyo Kabushiki Kaisha, Tokyo, Japan

[21] Appl. No.: 597,865

[22] Filed: Apr. 9, 1984

[30] Foreign Application Priority Data

Apr. 11, 1983 [JP] Japan .................................. 58-63925

[51] Int. Cl.$^4$ ................................................ F02B 3/00
[52] U.S. Cl. ..................................... 123/589; 123/440
[58] Field of Search ............... 123/440, 339, 585, 589, 123/489

[56] References Cited

U.S. PATENT DOCUMENTS

| | | | |
|---|---|---|---|
| 4,359,983 | 11/1982 | Carlson | 123/339 |
| 4,380,985 | 4/1983 | Otsuka | 123/440 |
| 4,385,602 | 5/1983 | Itou | 123/585 |
| 4,407,243 | 10/1983 | Otsuka | 123/585 |
| 4,414,950 | 11/1983 | Otsuka | 123/585 |

*Primary Examiner*—Ronald B. Cox
*Attorney, Agent, or Firm*—Pollock, Vande Sande & Priddy

[57] ABSTRACT

An air/fuel ratio feedback control system for an internal combustion engine of a vehicle includes means for determining an air/fuel ratio on the basis of an output signal of an oxygen sensor, an auxiliary supply passage for supplying the secondary air or fuel to the engine, a control valve for controlling the amount of the air or fuel flowing through the auxiliary passage, a control means for controlling the opening degree of the control valve in accordance with the determined state of the air/fuel ratio, means for detecting an operational state of the engine or the vehicle in which the feedback control of the air/fuel ratio is to be stopped and producing a detection signal, and means for maintaining the opening degree of the control valve at a middle level upon presence of the detection signal, whereby preventing the generation of over rich mixture during a transient period after the feedback control of the air/fuel ratio is restarted.

4 Claims, 7 Drawing Figures

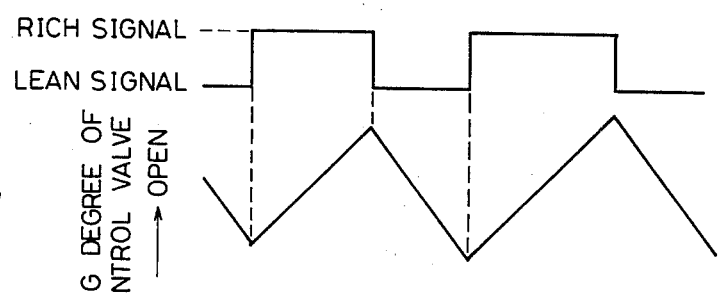
FIG. 3A
FIG. 3B
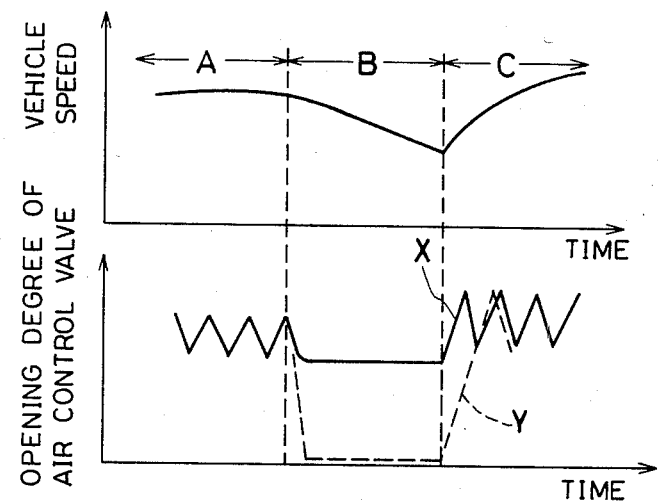
FIG. 4A
FIG. 4B

AIR/FUEL RATIO FEEDBACK CONTROL SYSTEM FOR AN INTERNAL COMBUSTION ENGINE OF A VEHICLE

BACKGROUND OF THE INVENTION

1. Field of the Invention

The present invention relates to an air/fuel ratio feedback control system for an internal combustion engine of a vehicle.

2. Description of Background Information

In an internal combustion engine provided with a three-way catalytic converter in the exhaust system, the feedback air/fuel ratio control system is designed to control the air/fuel ratio of the engine around a stoichiometric value (14.7:1 for example) in accordance with the composition of the exhaust gas and operational conditions of the engine. This is because an optimum operation of the catalytic converter is enabled around the stoichiometric value of the air/fuel ratio.

As this type of the air/fuel ratio control system, the present applicant has already proposed a type of the so called air intake side secondary air supply system. In the air intake side secondary air supply system of the applicant, there is provided an air control valve disposed in a secondary air supply passage communicated with the downstream of the throttle valve, for varying the sectional area of the secondary air supply passage in accordance with the pressure level in a pressure chamber of the air control valve. Further, the actual air/fuel ratio is detected from an oxygen content of the exhuast gas, and a first control pressure capable of opening the air control valve is applied to the pressure chamber of the air control valve, to gradually increase the sectional area of the secondary air supply passage when the detected air/fuel ratio is rich and a second control pressure capable of closing the air control valve is applied to the pressure chamber of the air control valve, to gradually decrease the sectional area of the secondary air supply passage when the detected air/fuel ratio is lean.

In the case of the internal combustion engine of a vehicle, during a deceleration, for example, the accelerator pedal may be released suddenly to cause an abrupt closing of the throttle valve. As the result, an excessive amount of fuel is sucked from the carburetor and applied to the engine cylinders due to an instantaneous increase of the vacuum level. Further, since the amount of the intake air is restricted by the throttle valve during deceleration, the air/fuel ratio becomes over rich due to the lack of required amount of the air, and the pressure in the engine cylinders goes down at the same time. Therefore, the temperature of combustion also goes down to cause unstable state of the combustion, which results in the production of an amount of noxious component, mainly HC (hydrocarbons) as unburnt component and CO (carbon monoxide), in the exhaust gas of the engine.

Conventionally, measures have been taken to suppress the discharge of this unburnt component, in which an exhaust side secondary air is introduced into the exhaust gas passage for the oxidization of the unburnt component during deceleration of the engine. However, in the case of the above mentioned air/fuel ratio control system, not only during the deceleration, the oxygen sensor produces a lean signal to indicate the condition of lean mixture when the exhaust side secondary air is supplied. This is because the supply of the secondary air is performed upstream of the oxygen sensor, and the air/fuel ratio of the mixture is falsely determined to be lean in accordance with the lean signal from the oxygen sensor. Therefore, the pressure chamber of the air control valve is supplied with the second control pressure to cause the closure of the air control valve. In other words, during deceleration, the air/fuel ratio is shifted to the rich side to stop the feedback control, and the control state turns to the open loop. After the deceleration, the supply of the exhaust side secondary air is stopped at the time of acceleration, and the opening degree of the air control valve is controlled in accordance with the oxygen sensor output signal, to start the feedback control once more.

However, it takes a time before detecting the rich air/fuel ratio by means of the output signal of the oxygen sensor when the supply of the exhaust side secondary air is stopped. Moreover, since the pressure value in the pressure chamber of the air control valve at the time of the cease of the supply of the exhaust side secondary air is substantially equal to the pressure level of the second control pressure, it also takes relatively long time before the air control valve is fully opened by the supply of the first control pressure into the pressure chamber in accordance with the output signal of the oxygen sensor after the supply of the exhaust side secondary air is stopped.

Due to this delay of response of the air control valve, the delay of the change of the air/fuel ratio toward the lean side is inevitable and the unburnt component such as HC and CO is generated as the result of the over rich air/fuel mixture.

Further, this problem is not limited in the state of deceleration of the vehicle in which the air/fuel ratio control is switched to the open loop control state, but also present in the other driving states of the vehicle in which the exhaust side secondary air is supplied when the open loop control is established, and the supply of the exhaust side secondary air is stopped at the same time of restarting the feedback control.

SUMMARY OF THE INVENTION

An object of the present invention is therefore to provide an air/fuel ratio feedback control system for an internal combustion engine of a vehicle, in which the generation of the noxious components at the time of restarting of the closed loop, or feedback, control is suppressed.

According to the present invention, the feedback control system is constructed to maintain the opening degree of a valve for controlling the amount of the fuel or the air supplied to the engine, for example, the air control valve, at an intermediate level regardless of the state of the output signal of the air/fuel ratio detection means upon detection of an operational state of the engine in which the air/fuel ratio control is to be switched to the open loop control mode.

Further scope and applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following description taken in conjunction with the accompanying drawings which are given by way of illustration only, and thus are not limitative of the present invention, and wherein:

FIGS. 3A and 3B are diagrams showing the variation of opening degree of the air control valve 12 with respect to the timing of the rich signal and the lean signal produced from the control circuit 22;

FIGS. 4A and 4B are diagrams showing the variation of the opening degree of the air control valve 12 when the vehicle is running with varying speed, including a period in which the feedback control is stopped.

DETAILED DESCRIPTION OF PREFERRED EMBODIMENTS

Figure 1:
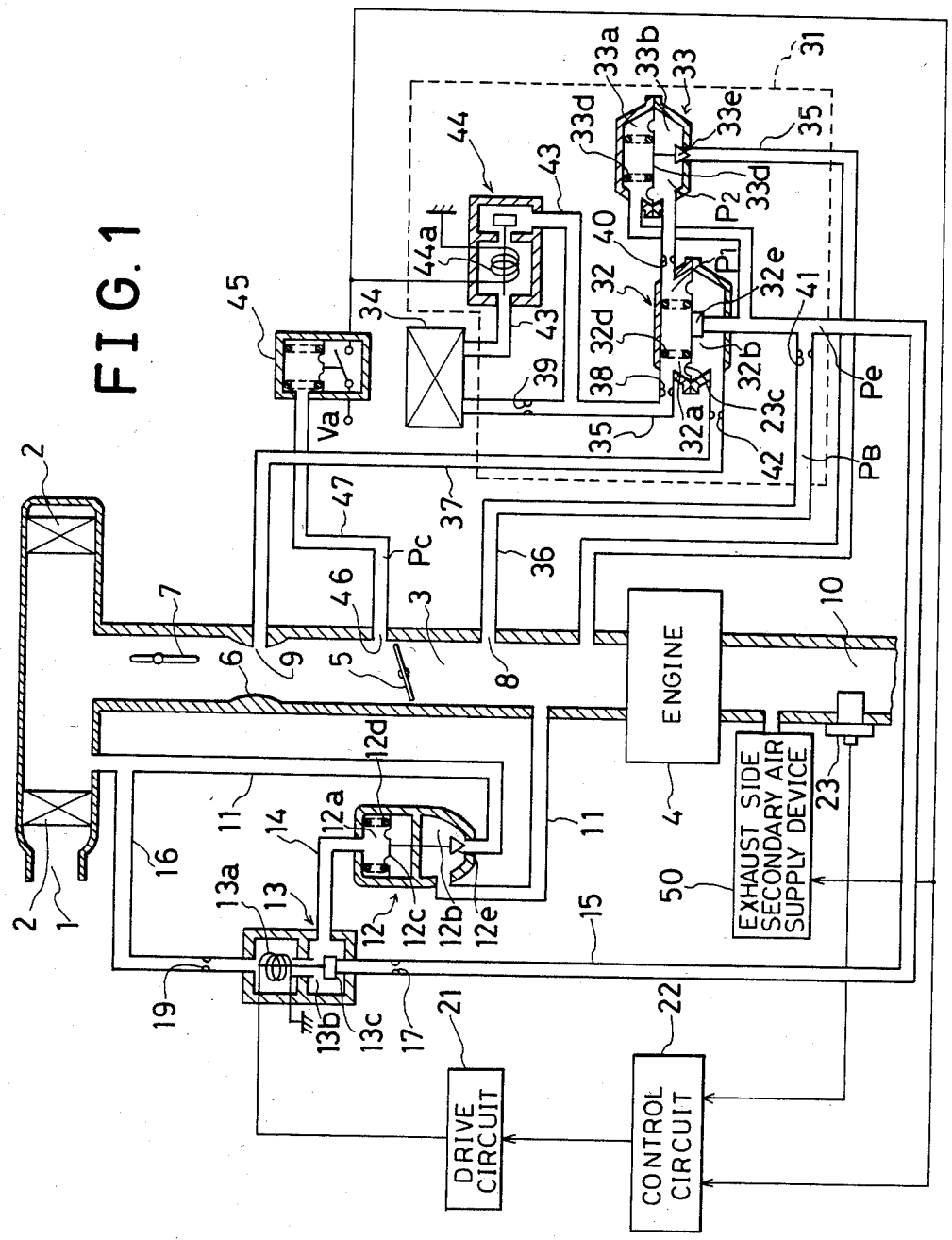
FIG. 1 is a schematic diagram of a first embodiment of the air/fuel ratio feedback control system according to the present invention.

The first embodiment of the air/fuel ratio feedback control system according to the present invention will be explained with reference to the schematic diagram of FIG. 1 hereinafter.

As shown, intake air taken from an air inlet port 1 is supplied to an internal combustion engine 4 via an air cleaner 2 and intake air passage 3. In the intake air passage 3, a throttle valve 5 is provided in the middle. Further, a venturi 6 is formed upstream from the throttle valve 5 and a choke valve 7 is disposed upstream of the venturi 6. In the wall surface of the intake air passage 3, a first vacuum detection hole 8 is provided downstream of the throttle valve 5. A second vacuum detection hole 9 is also provided to the venturi 6. A portion of the air intake system downstream of the throttle valve 5, i.e., the intake manifold is communicated with a portion around an air outlet port of the air cleaner 2 via an air intake side secondary air passage 11. In the secondary air passage 11, there is provided an air control valve 12 which consists of a vacuum chamber 12a, a valve chamber 12b acting as a part of the secondary air passage 11, a diaphragm 12c defining a wall of the vacuum chamber 12a, and a needle type valve element 12e placed in the valve chamber 12b and applied with a biasing force of a valve spring 12d via the diaphragm 12c to close the secondary air passage 11. With this construction, the cross sectional area of the secondary air passage 11 is increased as the magnitude of the vacuum acting upon the vacuum chamber 12a increases.

To the vacuum chamber 12a of the air control valve 12, there is applied a vacuum pressure from a three-way electro-magnetic valve 13 via a pressure passage 14. The electro-magnetic valve 13 includes solenoid 13a, a valve chamber 13b communicated with the vacuum chamber 12a via the pressure passage 14, and a valve element 13c which is mounted in the valve chamber 13b and magnetically coupled with the solenoid 13a. The valve chamber 13b is communicated with a vacuum control part 31 which produces a first control pressure via a vacuum passage 15 for introducing the first control pressure, and also communicates with the part of the secondary air passage 11 upstream from the air control valve 12 via an atmospheric pressure passage 16 for introducing a second control pressure. When the solenoid 13 is not energized, the side of the vacuum passage 15 is closed, and at the same time the pressure passage 14 and the atmospheric pressure passage 16 are communicated with each other via the valve chamber 13b. On the other hand, when the solenoid 13a is energized, the side of the atmospheric pressure passage 16 is closed, and at the same time the pressure passage 14 and the vacuum passage 15 are communicated with each other. Further, an orifice 17 is provided in a vacuum passage 15 and an orifice 19 is provided in the atmospheric pressure passage 16.

The solenoid 13a is connected to a control circuit 22 via a drive circuit 21. The control circuit 22 receives an output signal of an oxygen sensor 23 which is disposed in an exhaust passage 10 of the engine 4 and produces the output signal having a level representative of the oxygen contents of the exhaust gas.

The vacuum control part 31 consists of a vacuum responsive regulator valve 32 and an air valve 33 which consists of a vacuum chamber 32a or 33a, a diaphragm 32c or 33c, a valve spring 32d or 33d, and a valve element 32e or 33e respectively. The vacuum chamber 32a is disposed in the middle of a control air passage 35 which leads from an atmospheric air inlet port 34 with a filter to a part of the intake air passage downstream of the throttle valve 5, and the valve chamber 33b is disposed in the control air passage 35 downstream of the vacuum chamber 32a. The valve element 33e is applied with a resilient force of the valve spring 33d via the diaphragm 33c so as to close the control air passage 35. The vacuum chamber 33a is communicated with the vacuum detection hole 8 via a vacuum passage 36, and similarly, the valve chamber 32b is communicated with the vacuum detection hole 9 via a vacuum passage 37. The valve chamber 32b is communicated with the vacuum passage 36 and the valve element 32e is applied with a resilient force of the valve spring 32d via the diaphragm 32c so that the communication between the valve chamber 32b and the vacuum passage 36 is closed by the valve element 32e. In addition, in the control air passage 35, orifices 38 and 39 are provided upstream of the vacuum chamber 32a and an orifice 40 is provided between vacuum chamber 32a and valve chamber 33b. Further, orifices 41 and 42 are provided respectively in the vacuum passage 36 and the vacuum passage 37. A part of the vacuum passage 36 on the side of the valve chamber 32b and the vacuum chamber 33a from the orifice 41 is communicated with the vacuum passage 15.

In the control air passage 35, the orifice 39 is disposed on the side of the atmospheric air inlet port 34 from the orifice 38, and an auxiliary control air passage 43 is provided in such a manner as to bypass the orifice 39. In the auxiliary control air passage 43, there is provided an electro-magnetic valve 44 having a solenoid 44a which is applied with a drive voltage Va via a vacuum switch 45. The electro-magnetic valve 44 is opened to make the communication through the auxiliary control air passage 43 when the solenoid 44a is de-energized, and closed to stop the communication through the auxiliary control air passage when the solenoid 44a is energized. The vacuum switch 45 is provided to detect a fully closed state of the throttle valve 5 and therefore designed to turn on when the magnitude of the vacuum applied from the intake air passage 3 to a pressure chamber thereof is lower than a predetermined value. The pressure chamber of the vacuum switch 45 is communicated with a vacuum passage 47 which opens into the intake air passage 3 at a vacuum detection hole 46. The position of the vacuum detection hole 46 is so determined as to be located upstream of the throttle valve 5 when the throttle valve 5 is closed, and downstream of the throttle valve 5 when the throttle valve 5 is opened. The above configuration of the vacuum switch 45 is because the level of the vacuum in the vacuum detection hole 46 disposed in the vicinity of the throttle valve 5 decreases below a predetermined level, 100 mmHg for example, when the throttle valve 5 is fully closed. In addition, the drive voltage Va is also applied to the control circuit 22 when the vacuum switch 45 is closed.

The operation of the thus constructed secondary air supply system part will be explained hereinafter.

The operation of the vacuum control part 31 is as follows. When a vacuum $P_B$ from the vacuum detection hole 8 is applied to the vacuum chamber 33a via the vacuum passage 36 in accordance with the operation of the engine 4, the valve element 33e is displaced in a direction to open the valve 33 if the vacuum pressure $P_B$ is greater than the resilient force of the valve spring 33d. By the opening of the air valve 33, outside air from the atmospheric air inlet port 34 is introduced to the intake air passage 3 at the downstream of the throttle valve 5, via the control air passage 35. The vacuum P1 and the vacuum P2 respectively in the vacuum chamber 32a and the valve chamber 33b through which the outside air travels, are determined in accordance with the aperture ratio of the orifices 38 and 40, electro-magnetic valve 44 and orifice 39 respectively.

In this condition, if the differential pressure between the vacuum Pv from the vacuum detection hole 9, acting in the valve chamber 32b and the vacuum P1 is greater than the resilient force of the valve spring 32d, the valve element 32e is displaced in the direction to open the valve 32. By this opening of the control valve 32, a part of the vacuum Pv is directed to dilute the vacuum past the orifice 41 to produce a vacuum Pe acting in the vacuum chamber 33a.

Subsequently, due to the drop of the vacuum Pe, the opening degree of the air valve 33 is decreased to reduce the amount of the air flowing through the control air passage 35. By this reduction in the air flow amount, the vacuum P1 in the vacuum chamber 32a is reduced to close the control valve 32. Then the vacuum Pe is raised once more and the above sequential operations will be repeated. It is to be noted that the ratio between the vacuum Pv and the vacuum Pe becomes equal to the ratio between the vacuum P1 and the vacuum P2, since the speed of these repeating operations is very fast.

Therefore, when the amount of the main intake air of the engine 4 is relatively small where the vacuum P1 is greater than Pv, the opening degree of the regulation valve 32 becomes large and the vacuum Pe becomes low. On the other hand, as the amount of the main intake air increases, the opening degree of the regulation valve 32 becomes smaller since the vacuum Pv increases, and consequently the vacuum Pe becomes high. Since the vacuum Pe acts in the vacuum chamber 12a as well as in the vacuum chamber 33a to open the air valve 33 and air control valve 12 during the actuation of the electro-magnetic valve 13, the amount of the air flowing through the control air passage 35 for opening the air valve 33 becomes proportional to the amount of the secondary air which flows through the air control passage 11 when the electro-magnetic valve 13 is activated. Similarly, the amount of the main intake air supplied to the engine 4 via the intake air passage 3 becomes proportional to the amount of the secondary air flowing through the secondary air passage 11 by the opening of the air control valve 12. As a result, the vacuum Pe has a value proportional to the amount of the main intake air to the engine and forms the first control pressure to be introduced into the vacuum chamber 12a.

Figure 2:
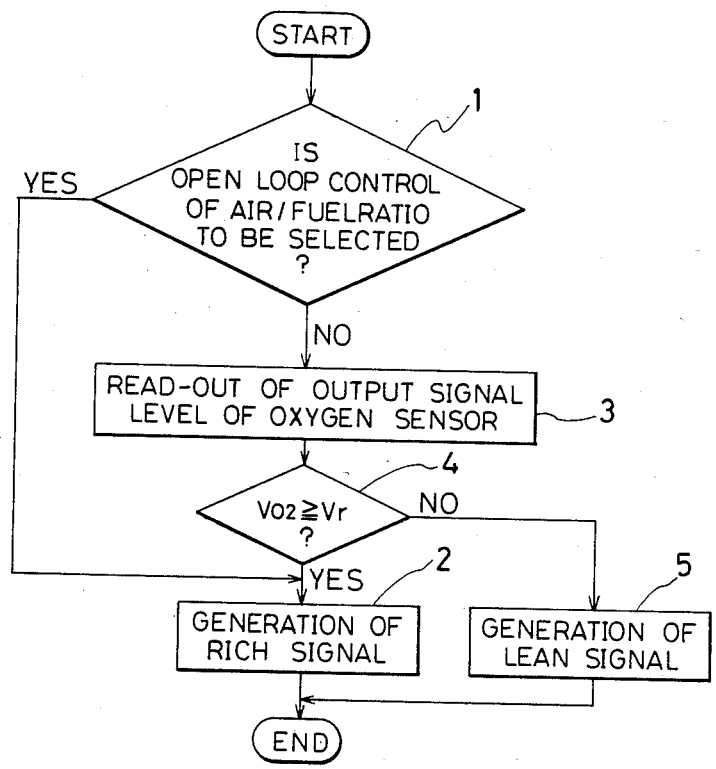
FIG. 2 is a flowchart showing the manner of operation of the control circuit 22 of the feedback control system of FIG. 1.

The operation of the control circuit 22 will be then explained with reference to the flowchart of FIG. 2.

When an ignition switch (not shown) is turned on and a power current is supplied to the control circuit 22, the control circuit 22 firstly detects whether or not the engine or the vehicle in which the open loop control of the air/fuel ratio is to be effected, is operating, at a step 1. This detection operation is performed by discriminating whether or not the drive voltage Va is supplied from the vacuum switch 45. If the drive voltage Va is being applied, the control circuit 22 determines that the air/fuel ratio feedback control is to be stopped, i. e., the open loop control is to be started, and supplies a rich signal to the drive circuit 21 at a step 2. On the other hand, if the drive voltage Va is not being supplied, the control circuit 22 determines that the air/fuel ratio feedback control is to be started, and read-out the output signal level of the oxygen sensor 23 at a step 3. Since the oxygen sensor 23 is of the so-called flow-out type, the output voltage $VO_2$ thereof increases as the ambient condition becomes rich. After reading out of the output voltage $VO_2$, the air/fuel ratio of the mixture is determined at a step 4, from this output voltage $VO_2$.

In this determination step, whether the air/fuel ratio is rich or lean is determined by comparing the output voltage $VO_2$ of the oxygen sensor 23 with a reference voltage Vr which corresponds to a stoichiometric air/fuel ratio. If $VO_2 < Vr$, the air/fuel ratio is determined to be lean, and a lean signal is applied to the drive circuit 21 to shift the air/fuel ratio to the rich side, at a step 5. On the other hand, if $VO_2 \geq Vr$, the air/fuel ratio is determined to be rich, and the rich signal is applied to the drive circuit 21 to shift the air/fuel ratio to the lean side, at a step 2.

Thus, when the lean signal or the rich signal is applied to the drive circuit 21 from the control circuit 22, the drive circuit makes the electro-magnetic valve 13 inactivated by failing to supply the drive current of the solenoid 13a in accordance with the lean signal or makes the same activated by supplying the drive current of the solenoid 13a in accordance with the rich signal.

Assume that the output signal of the control circuit 22 turns from the lean signal to the rich signal, the electro-magnetic valve 13 is then activated to close the side of the atmospheric pressure passage 16 and at the same time make communication between the pressure passage 14 and the vacuum passage 15. As a result, the vacuum in the vacuum chamber 12a gradually approaches to the vacuum Pe because the vacuum Pe is supplied from the vacuum control part 31 to the vacuum chamber 12a via the orifice 17, and consequently the opening degree of the air control valve 12, i.e., the sectional area of the secondary air passage 11 gradually increases to increase the supply amount of the secondary air. When the vacuum in the vacuum chamber 12a has reached a value equal to the vacuum Pe, the amount of the secondary air flowing through the secondary air passage 11 becomes proportional to the amount of the main intake air, thus the engine 4 is supplied with the secondary air whose amount is proportional to the main intake air amount.

Next, assume that the output signal from the control circuit 22 turns from the rich signal to the lean signal, the electro-magnetic valve 13a is then inactivated and the side of the vacuum passage 15 is closed and at the same time, the pressure passage 14 is communicated with the atmospheric pressure passage 16. As a result, the vacuum in the vacuum chamber 12a gradually approaches to the atmospheric pressure value because the atmospheric pressure is supplied to the vacuum chamber 12a via the orifice 19, to gradually reduce the sectional area of the secondary air passage 11 and also reduce the amount of the secondary air. When the pressure in the vacuum chamber has become equal to the atmospheric pressure, the air control valve 12 closes to block the secondary air passage 11, and the supply of the secondary air to the engine 4 is stopped.

Accordingly, when the air/fuel ratio is to be controlled to the stoichiometric value, the rich signal and the lean signal are produced alternately and successively as illustrated in FIG. 3A, and the openig degree of the air control valve 12 increases upon presence of the rich signal and decreases upon presence of the lean signal as illustrated in FIG. 3B. Since the sectional area of the secondary air passage 11 and the amount of the air intake side secondary air flowing therethrough vary in the same manner, the central value of the air/fuel ratio control is adjusted to the stoichiometric value.

Next, the operation of the system under the open loop control of the air/fuel ratio will be explained. When, for example, the accelerating pedal is released by the driver during the vehicle is running on a flat road, then the vehicle decelerates. In this state, the magnitude of the vacuum Pc supplied to the pressure chamber of the vacuum switch 45 from the vacuum detection hole 46 falls below the predetermined level due to the closure of the throttle valve 5 and the vacuum switch 45 turns on to provide the drive voltage Va to the solenoid 44a. Consequently, the the electro-magnetic valve 44 closes to start the open loop operation. In this state, the auxiliary control air passage 43 is closed by the electro-magnetic valve 44 and the sectional area of the control air passage 35 is decreased. Therefore, the proportion of the air flowing through the control air passage 35 with respect to the amount of the main intake air is decreased as compared with the state in which the electro-magnetic valve 44 is opened. With this change in the proportion, the opening degree of the air control valve 32 increases to raise the amount of the leak of the vacuum $P_B$ into the vacuum passage 37. Therefore, the magnitude of the vacuum Pe decreases to open the air control valve 12 at an intermediate opening degree.

At the same time, the exhaust pipe 10 is supplied with the exhaust side secondary air from an exhaust side secondary air supply device 50. Therefore, the condition in the exhaust pipe 10 is made lean and the level of output signal $VO_2$ of the oxygen sensor 23 becomes lower than the the reference voltage Vr. However, the control circuit 22 produces the rich signal in spite of the low level output signal $VO_2$ of the oxygen sensor 23 since the drive voltage Va is supplied to the control circuit 22 from the vacuum switch 45. Thus, the electro-magnetic valve 13 is actuated to provide the vacuum Pe to the vacuum chamber 12a. Therefore, as mentioned, the air control valve 12 is maintained at halfway opened position to supply the air intake side secondary air into the downstream of the throttle valve 5.

Next, under a condition when the deceleration of the vehicle is ceased and the vehicle is accelerating, the accelerator pedal is pressed to open the throttle valve 5. By the opening of the throttle valve 5, the magnitude of the vacuum in the vacuum detection hole 46 becomes higher than the predetermined level and the vacuum switch 45 turns off to open the electro-magnetic valve 44. With this operation, the feedback control of the air/fuel ratio is restarted.

In this state, the amount of the air flowing into the downstream of the throttle valve 5 through the control air passage 35 increases to raise the magnitude of the vacuum Pe. As a result, the opening degree of the air control valve 12 increases. In addition, the exhaust side secondary air supply device 50 stops the supply of the exhaust side secondary air and the air/fuel ratio is controlled to the stoichiometric value.

The operation of the air/fuel ratio control system under these sequential operational conditions of the engine will be explained with reference to FIGS. 4A and 4B. When the driving state of the vehicle is changed from the cruise (constant speed) running state A to the decelerating state B and to the accelerating state C as shown in FIG. 4A, the opening degree of the air control valve 12 is varied in a manner as shown by the solid line X of FIG. 4B. However, since the opening degree of the air control valve 12 at the decelerating state B is maintained at the medium value, the change of the opening degree of the air control valve at the initiation of the accelerating state C is minimized. This means that the air control valve 12 reaches the opening degree corresponding to the stoichiometric value of the air/fuel ratio much more quickly than the conventional contol method in which the air control valve 12 is fully closed during deceleration, as shown by the dashed line Y of FIG. 4B.

Moreover, the opening degree of the air control valve 12 is maintained at the medium level also during idling of the engine due to the closure of the throttle valve 5, and consequently the vacuum switch 45. Therefore, the time required for opening the air control valve 12 in the transient period from the idling state to the accelerating state of the engine is minimized.

Figure 5:
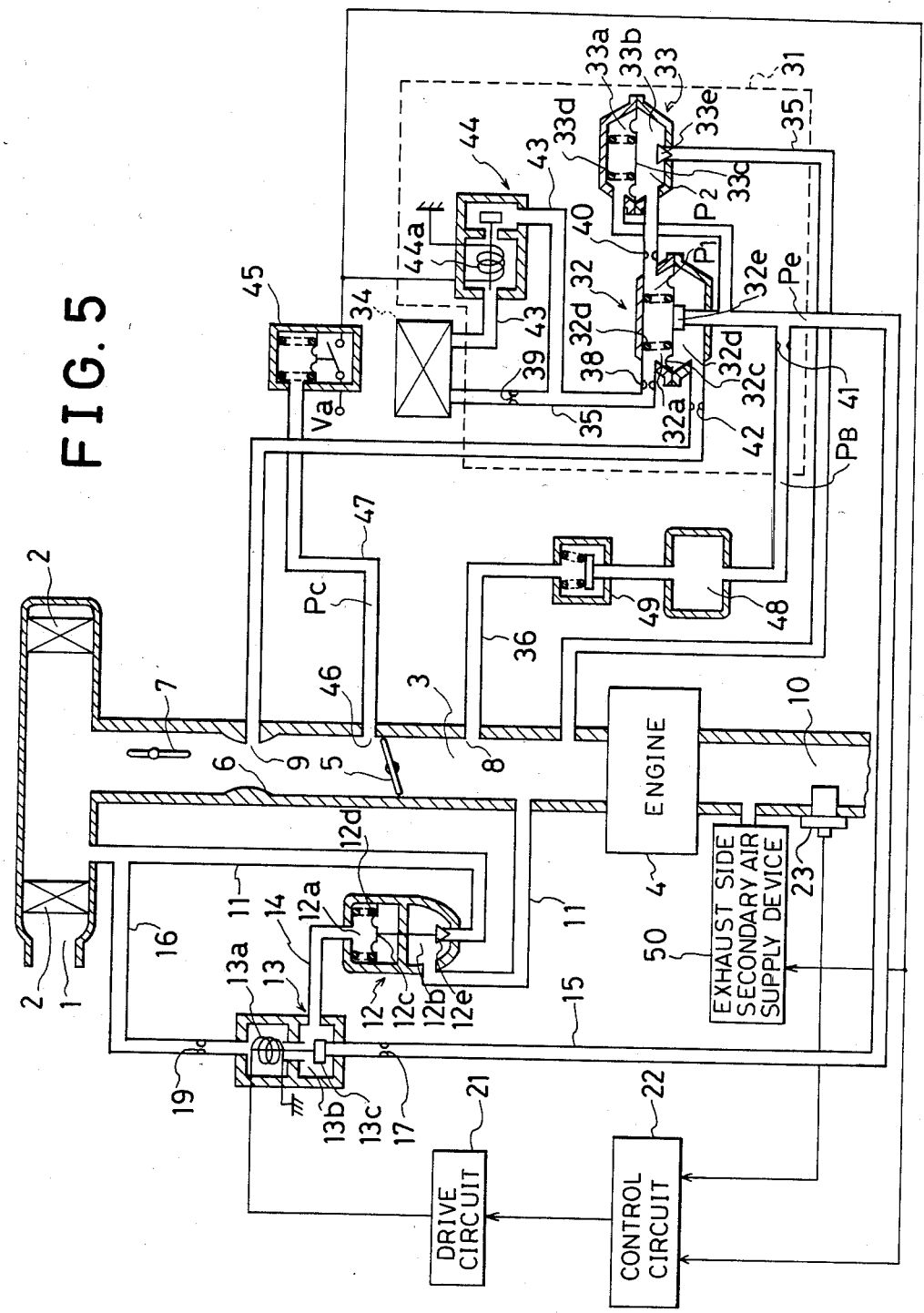
FIG. 5 is a schematic diagram of the second embodiment of the air/fuel ratio feedback control system in which an accumulator chamber 48 and a non-return valve 49 is disposed in the vacuum passage 36 for maintaining the medium level of the first control pressure.

Turning to FIG. 5, the second embodiment of air/fuel ratio feedback control system of the invention will be explained.

As shown, the vacuum passage 36 is provided, on the side of the vacuum detection hole 8 from the orifice 41, with an accumulator chamber 48 and a non-return valve 49. The accumulator chamber 48 is provided for maintaining the level of the vacuum $P_B$ to a predetermined level when the vacuum $P_B$ is decreasing below the predetermined level. The non-return valve 49 is provided on the side of the vacuum detection hole 8 from the accumulator chamber 48, and only permits the pressure directed to the vacuum detection hole 8. Since the other portions of this embodiment are identical with those of the first embodiment, the explanation thereof is omitted.

In the case of this embodiment, the air/fuel ratio feedback control system is characterized in that the opening degree of the air control valve 12 is maintained at the medium level also during a high load operation of the engine 4. More specifically, the feedback control of the air/fuel ratio is stopped for obtaining a high output power of the engine by a rich mixture during the high load operation of the engine 4. However, in this state, the magnitudes of the vacuums $P_B$ and $P_C$ are decreased by a full opening of the throttle valve 5. Therefore, in conventional arrangement, even the vacuum switch 45 is closed by the decrease of the vacuum $P_C$, the air control valve 12 can not be maintained at its medium opening state because the vacuum $P_e$ is decreased by the fall of the vacuum $P_B$. In the case of this embodiment, on the other hand, the position of the air control valve 12 is maintained at the medium position because the level of the vacuum $P_B$ is maintained a predetermined value by means of the accumulator chamber 48.

It will be appreciated from the foregoing, that according to the present invention, the opening degree of the control valve which adjusts the amount of the air or fuel supplied to the engine is maintained at the intermediate position during the period of the open loop control mode of air/fuel ratio feedback control system. Therefore, the period of the control operation in which the opening degree of the control valve reaches the opening value corresponding to the stoichiometic value of the air/fuel ratio at the time of restarting of the feedback control is by far shortened as compared with conventional arrangements. Therefore, a great improvement has been achieved in suppressing the generation of the noxious components in exhaust gas during such period of control operation.

In addition, in the case of the embodiment of the air/fuel ratio feedback control system shown in FIG. 1, there is an advantage that the amount of the secondary air supplied to the engine when the air control valve 12 is maintained at the intermediate opening degree can be varied in accordance with the amount of the main intake air because the magnitude of the vacuum supplied to the pressure chamber for maintaining the opening degree of the air control valve varies with the amount of the main intake air.

It will be appreciated that the foregoing description is for illustrative purposes only, and is not intended to limit the scope of the invention. Rather, there are numerous equivalents to the preferred embodiments, and such are intended to be covered by the appended claims.

As an example, instead of the air control valve 12 whose opening degree is controlled by a pressure value of the control pressure applied to the pressure chamber 12a of the preferred embodiments, other types of the control valve such as an electro-magnetic valve and a control valve linked with a pulse motor can be used as the control valve.

Further, a control means of the opening degree of the valve can be constructed by a microprocessor system in which a plurality of the values of the opening degree of the control valve corresponding to various operational states of the engine or the vehicle, are previously stored in a memory device in the form of a data map, and the opening degree of the control valve is controlled to a desired value by reading-out a stored value of the opening degree from the data map in accordance with various engine parameters which are detected during the operation of the engine or the vehicle.

Further, instead of the application of the present invention in a system which controls the amount of the air to the engine, the present invention can be adapted to a system in which the amount of the fuel supplied to the engine is controlled, for example, by providing the control valve in a fuel supply passage leading to the fuel metering device such as a carburetor.

Moreover, instead of detecting the timing of the open loop control by means of the vacuum in the vicinity of the throttle valve, this timing can be determined from one of various parameters such as the engine coolant temperature and the vacuum in the intake air passage downstream of the throttle valve.

What is claimed is:

1. An air/fuel ratio feedback control system for an internal combustion engine of a vehicle, comprising:
   an oxygen sensor disposed in an exhaust passage of the engine;
   an air/fuel ratio detection means for detecting an air/fuel ratio on the basis of an output signal of the oxygen sensor and generating an air/fuel ratio detection signal;
   an auxiliary passage for supplying a fluid of either intake air or fuel to the engine;
   a control valve disposed in said auxiliary passage for varying the amount of the fluid flowing therethrough, said control valve having a pressure chamber for receiving a control fluid and a valve element for varying the sectional area of said auxiliary passage in accordance with pressure level of the control fluid;
   means for generating a first control pressure for opening said control valve;
   means for generating a second control pressure for closing said control valve;
   communicating means responsive to said air/fuel ratio detection signal for switching the application of said first and second control pressure into said pressure into said pressure chamber in accordance with said air/fuel ratio detection signal;
   an operational state detection means for detecting an operational state of either the engine or the vehicle in which a feedback control of air/fuel ratio is to be stopped and producing a detection signal upon detection of said operational state; and
   an opening degree controlling means responsive to said detection signal, for controlling an opening degree of the control valve at an intermediate level upon presence of said detection signal by supplying a pressure having a pressure level intermediate of pressure levels of said first and second control pressures into said pressure chamber of control valve.

2. An air/fuel ratio feedback control system as set forth in claim 1, wherein said operational state detection means is adapted to generate said detection signal under at least one of the following conditions: when said vehicle is decelerating; when said engine is idling; or when said engine is operating under a high load condition.

3. An air/fuel ratio feedback control system as set forth in claim 1, wherein said means for generating first control pressure consists of:
   a first vacuum passage extending from an intake air passage of the engine, downstream or in the proximity of a throttle valve;
   a second vacuum passage extending from inside of a venturi formed in said intake air passage, upstream from said throttle valve;
   a control intake air passage leading from an air inlet port to a portion of the intake air passage downstream of said throttle valve;
   a vacuum responsive regulation valve having a first vacuum chamber disposed in the middle of said control intake air passage, a first valve chamber communicated with said second vacuum passage, for making the communication between the first vacuum passage and the second vacuum passage through said first valve chamber, in accordance with a pressure difference of the first valve chamber and the first vacuum chamber;

a vacuum responsive air valve having a second vacuum chamber communicated with said first vacuum passage, a second valve chamber disposed in said control intake air passage, downstream from said first vacuum chamber, for providing a communication through said control intake air passage, at an opening degree corresponding to a pressure difference between said second vacuum chamber and said second valve chamber, whereby providing a vacuum in the second vacuum chamber as said first control pressure, and for reducing sectional area of said control air passage upstream form said first vacuum chamber upon presence of said detection signal.

4. An air/fuel ratio feedback control system as set forth in claim 3, wherein said means for reducing sectional area includes an orific provided in said control intake air passage between said atmospheric pressure inlet port and said first vacuum chamber, a by-pass passage for by-passing said orifice, and an electro-magnetic valve for controlling the communication through said by-pass passage in accordance with said detection signal.

* * * * *